US010264293B2

(12) United States Patent
Hoeben

(10) Patent No.: US 10,264,293 B2
(45) Date of Patent: Apr. 16, 2019

(54) SYSTEMS AND METHODS FOR INTERLEAVING VIDEO STREAMS ON A CLIENT DEVICE

(71) Applicant: ActiveVideo Networks, Inc., San Jose, CA (US)

(72) Inventor: Maarten Hoeben, Amersfoort (NL)

(73) Assignee: ActiveVideo Networks, Inc., San Jose, CA (US)

(*) Notice: Subject to any disclaimer, the term of this patent is extended or adjusted under 35 U.S.C. 154(b) by 0 days.

(21) Appl. No.: 14/757,935

(22) Filed: Dec. 23, 2015

(65) Prior Publication Data

US 2016/0191960 A1 Jun. 30, 2016

Related U.S. Application Data

(60) Provisional application No. 62/096,790, filed on Dec. 24, 2014.

(51) Int. Cl.
| | | |
|---|---|---|
| *H04N 21/234* | (2011.01) | |
| *H04N 21/2343* | (2011.01) | |
| *H04N 21/236* | (2011.01) | |
| *H04N 21/2389* | (2011.01) | |
| *H04N 21/431* | (2011.01) | |
| *H04N 21/44* | (2011.01) | |

(Continued)

(52) U.S. Cl.
CPC ..... *H04N 21/234* (2013.01); *H04N 21/23406* (2013.01); *H04N 21/23614* (2013.01); *H04N 21/23892* (2013.01); *H04N 21/234309* (2013.01); *H04N 21/4316* (2013.01); *H04N 21/44* (2013.01); *H04N 21/44004* (2013.01); *H04N 21/4622* (2013.01); *H04N 21/8455* (2013.01)

(58) Field of Classification Search
None
See application file for complete search history.

(56) References Cited

U.S. PATENT DOCUMENTS

| 5,642,498 A * | 6/1997 | Kutner ............... G09G 5/393 345/536 |
| 6,539,545 B1 * | 3/2003 | Dureau ............. H04N 7/17336 348/14.07 |
| 6,850,490 B1 | 2/2005 | Woo et al. |

(Continued)

FOREIGN PATENT DOCUMENTS

WO    WO01/56293 A1    8/2001

OTHER PUBLICATIONS

ActiveVideo Networks, Inc., International Search Report and Written Opinion, PCTUS2015/000502, dated May 6, 2016, 8 pgs.

(Continued)

*Primary Examiner* — Jason K Lin
(74) *Attorney, Agent, or Firm* — Morgan, Lewis & Bockius LLP

(57) ABSTRACT

A method of displaying video embedded in a user interface is performed at an electronic device such as a server system or client device. The method includes obtaining user-interface frames having a first placeholder for a first video window and obtaining source video frames having a first video stream in the first video window. The source video frames and the user-interface frames are interleaved to form an output video stream, which is provided for decoding and display.

20 Claims, 12 Drawing Sheets

(51) Int. Cl.
*H04N 21/845* (2011.01)
*H04N 21/462* (2011.01)

(56) References Cited

U.S. PATENT DOCUMENTS

| | | | |
|---|---|---|---|
| 8,781,240 B2 | 7/2014 | Srinivasan et al. | |
| 9,204,113 B1* | 12/2015 | Kwok | H04N 5/2355 |
| 9,621,926 B1* | 4/2017 | Lee | H04N 21/234 |
| 9,635,440 B2* | 4/2017 | Lacroix | H04N 21/4122 |
| 2002/0116705 A1 | 8/2002 | Perlman et al. | |
| 2004/0111526 A1* | 6/2004 | Baldwin | H04N 5/4401 |
| | | | 709/231 |
| 2005/0034155 A1 | 2/2005 | Gordon et al. | |
| 2007/0266412 A1* | 11/2007 | Trowbridge | H04N 21/23424 |
| | | | 725/90 |
| 2008/0172441 A1 | 7/2008 | Speicher et al. | |
| 2009/0172431 A1 | 7/2009 | Gupta et al. | |
| 2010/0054268 A1 | 3/2010 | Divivier | |
| 2010/0158109 A1* | 6/2010 | Dahlby | H04N 7/17318 |
| | | | 375/240.03 |
| 2012/0216232 A1* | 8/2012 | Chen | H04N 21/234336 |
| | | | 725/109 |
| 2012/0271920 A1 | 10/2012 | Isaksson | |
| 2012/0297081 A1 | 11/2012 | Karlsson et al. | |
| 2013/0276015 A1 | 10/2013 | Rothschild et al. | |
| 2014/0089469 A1 | 3/2014 | Ramamurthy et al. | |
| 2014/0111526 A1 | 4/2014 | Asaka | |
| 2014/0223307 A1 | 8/2014 | McIntosh et al. | |
| 2014/0223482 A1 | 8/2014 | McIntosh et al. | |
| 2014/0269930 A1* | 9/2014 | Robinson | H04N 21/2365 |
| | | | 375/240.24 |
| 2014/0289627 A1* | 9/2014 | Brockmann | H04N 21/23412 |
| | | | 715/719 |
| 2015/0037011 A1 | 2/2015 | Hubner et al. | |
| 2015/0139603 A1* | 5/2015 | Silverstein | H04N 5/23216 |
| | | | 386/225 |
| 2015/0195525 A1* | 7/2015 | Sullivan | H04N 19/139 |
| | | | 375/240.02 |
| 2016/0050069 A1* | 2/2016 | Griffin | G02F 21/602 |
| | | | 713/189 |
| 2016/0119624 A1* | 4/2016 | Frishman | H04N 19/136 |
| | | | 375/240.02 |

OTHER PUBLICATIONS

ActiveVideo Networks, Inc., International Preliminary Report on Patentability, PCTUS2015/000502, dated Jun. 27, 2017, 5 pgs.
ActiveVideo Networks, Inc., International Search Report and Written Opinion, PCT/US2016/064972, dated Feb. 17, 2017, 9 pgs.
ActiveVideo Networks, Inc., International Preliminary Report on Patentability, PCT/US2016/064972, dated Jun. 5, 2018, 7 pgs.
ActiveVideo Networks, Inc., Extended European Search Report, EP15873840.1, dated May 18, 2018, 9 pgs.
ActiveVideo Networks, Inc., Communication Pursuant to Rules 70(2) and 70a(2), EP15873840.1, dated Jun. 6, 2018, 1 pg.
Visscher, Office Action, U.S. Appl. No. 15/368,527, dated Feb. 23, 2018, 24 pgs.
Visscher, Final Office Action, U.S. Appl. No. 15/368,527, dated Sep. 11, 2018, 25pgs.

* cited by examiner

SYSTEMS AND METHODS FOR INTERLEAVING VIDEO STREAMS ON A CLIENT DEVICE

RELATED APPLICATION

This application claims priority to U.S. Provisional Patent Application No. 62/096,790, filed Dec. 24, 2014, which is incorporated by reference herein in its entirety.

TECHNICAL FIELD

The present disclosure relates to interactive television, including, for example, systems and methods for streaming user interfaces for interactive television applications involving full motion video as well as graphical elements and for efficiently using available bandwidth by temporal interleaving of video streams with the user interface.

BACKGROUND

It is common for interactive television user interfaces to embed one or more partial-screen video streams in the user interface within windows occupying a portion of the display screen area. One example of such an interface is a channel selection guide, also known as an electronic program guide (EPG) or interactive program guide (IPG). Such guides sometimes display the currently-selected channel or a user-selected channel as a picture-in-picture window somewhere within the viewable user interface. Another example is a video-on-demand user interface where a preview video of an available movie is displayed within a portion of the viewable user interface in a window. Such video previews can significantly enhance the user's interactions with the user interface. As another example, a video window may allow for browsing alternate channels without leaving the currently selected channel or may show a preview of a newly-selected channel. A preview window may encourage the user to purchase a premium content offering as opposed to an older movie, for example, thereby increasing revenue for the system operator and content owner.

In managed networks such as cable television systems, the application providing the user interface may run on a client device (e.g., a cable TV set-top box, a so-called Smart TV, or any of several other broadband connected devices) while the embedded video stream may be decoded, scaled and embedded in the user interface, by means of the client device's hardware, software, or some combination thereof. In such systems, it may be difficult or even impossible to offer as compelling a user experience as might be currently possible since it would require hardware or software enhancements that were not foreseen when the original design of the set-top box or other client device was specified. For example, if the application requires that two embedded video streams be displayed simultaneously instead of a single video stream, the client device's hardware either may not have a second decoder available for decoding the second stream, or the device's CPU may not have sufficient processing power to perform this function in software. Another disadvantage is that even if the new requirements for more complex user-interface presentation could be realized with the client device's hardware and software, it may be difficult to upgrade the application software on the client devices that have already been deployed or to upgrade the device firmware.

One approach to addressing the disadvantages of such legacy technology is to move the user-interface creation and related applications from the set-top in the home to a centrally located (and thus remote) server, such as a cable-TV headend in the case of cable set-tops or a server farm providing Internet delivered services to Internet-connected smart TVs and set-tops. The remote server executes one instance of the set-top application for each set-top box connected to it. Hence, the complexity of executing the application and decoding one or more embedded video streams is managed entirely by the remote server. This may be accomplished by executing the application in the memory of the remote server as a so-called virtual instance of the client device and encoding the resulting video frame buffer of the virtual instance, where the buffer contains an appropriately-combined video image of the rendered user interface and the decoded video streams as windows within the user interface, and, subsequently, sending the resulting video stream as a single program stream of the combined video sequence to the client device. The client device's role in such a system is limited to receiving and decoding the compliant video stream and sending back commands responsive to the user's interaction with the received images. Although this resolves the problems related to the flexibility and upgradability of legacy client devices, the so-called brute-force approach of virtualizing the complete system and encoding the frame buffer's contents frame-by-frame is computationally expensive and may not scale economically.

SUMMARY

In some embodiments, a method of displaying video embedded in a user interface is performed at an electronic device such as a server system or client device. The method includes obtaining user-interface frames having a first placeholder for a first video window and obtaining source video frames having a first video stream in the first video window. The source video frames and the user-interface frames are interleaved to form an output video stream, which is provided for decoding and display.

In some embodiments, an electronic device includes one or more processors and memory storing one or more programs for execution by the one or more processors. The one or more programs include instructions for performing the above-described method.

In some embodiments, a non-transitory computer-readable storage medium stores one or more programs for execution by one or more processors of an electronic device. The one or more programs include instructions for performing the above-described method.

BRIEF DESCRIPTION OF THE DRAWINGS

Embodiments disclosed herein are illustrated by way of example, and not by way of limitation, in the figures of the accompanying drawings.

DEFINITIONS

Figure 1:
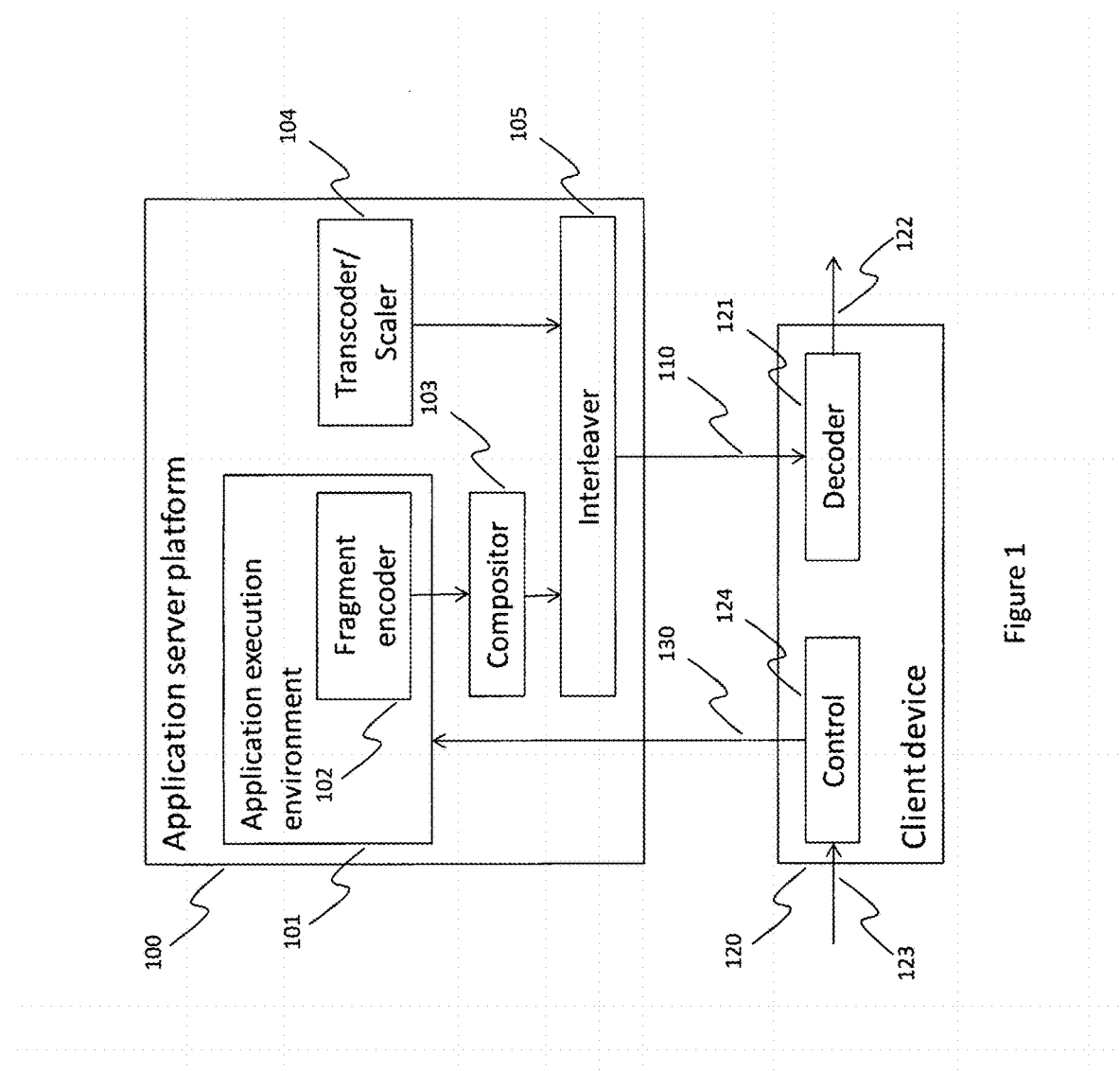
FIG. 1 is a block diagram that shows a system in which an application server platform communicates with a client device in accordance with some embodiments.

An "application execution environment" may be hardware and/or software that facilitates the execution of a software program or software application in a controlled environment. Examples of an application execution environment include but are not limited to an operating system (e.g., a virtualized operating system) and a web browser.

An "application", or software application, may be any combination of (but not limited to) binary code, script code, markup language, style sheets, etc. that can be executed or interpreted by the application execution environment.

An "encoding specification" may be, for example, an ISO MPEG, AVS, H.264/AVC or VC-1 specification, among others.

An "encoded fragment" may be a rectangular group of one or more macroblocks encoded according to an encoding specification. An encoded fragment may be intra-encoded (spatially-encoded), inter-encoded (temporally-encoded) or a combination thereof.

A "frame" is a rectangular group of one or more macroblocks, which may be grouped into one or more slices, according to an encoding specification, forming a coded picture.

A "video stream" may be an ordered set of video frames.

A "compositor" may composite (i.e., combine) one or more encoded fragments into a single compliant frame, according to an encoding specification.

An "interleaver" may temporally order frames from different sources into a single compliant video stream according to an encoding specification.

A "transcoder/scaler" may convert a video stream from one encoding specification and associated set of encoding parameters into another encoding specification and associated set of encoding parameters, in the process of which the video stream may also be scaled from one dimension into another.

"Intra-encoding" refers to spatially encoding graphical material: the encoding of the graphical material has no temporal relation to earlier graphical material and only spatial relations are used. A JPEG still image is an example of an intra-coded picture that is somewhat similar to an MPEG inter-coded (I) frame. "Inter-encoding" refers to temporally encoding graphical material: inter-encoded graphical material has a temporal relation to other graphical material. The temporal relationship is expressed in the form of motion vectors and/or pixel difference (residual) information.

"Residual" may be the difference between a temporally or spatially predicted macroblock and the actual macroblock being encoded.

A "transparency grid" is a checkerboard pattern that displays areas of transparency in images.

DETAILED DESCRIPTION OF THE EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1 is a block diagram of a system in which an application server platform 100 communicates with a client device 120 in accordance with some embodiments. The application server platform 100 includes an application execution environment 101 containing a fragment encoder 102, a compositor 103, a transcoder/scaler 104 and an interleaver 105. Via a downstream network connection 110, a client device 120 may receive a compliant video stream from the interleaver 105 that is decoded by a decoder 121 and output 122 to a display (not shown). The client device 120 may receive control commands (e.g., through a wireless remote control or keyboard) pertaining to the user's interaction 123 in a controller 124, which forwards corresponding control signals to the application server platform 100 via an upstream network connection 130.

The application execution environment 101 of the application server platform 100 executes a software application. The execution of the application results in structured graphical material that represent a user interface, which may be subsequently partitioned into rectangles that in turn are encoded into encoded fragments by the fragment encoder 102 according to an encoding specification and associated encoding parameters. Individual fragments, as encoded by the fragment encoder 102, are combined into a single user-interface frame by the compositor 103. Encoded fragments may be reused across parallel sessions to achieve system-wide scalability. Such reuse exploits the fact that sessions executing the same application may have common graphical material. If a session renders and encodes a part of a user interface update, other sessions may reuse certain encoded fragments and, hence, bypass the processing-intensive steps of rendering and encoding the said fragments. The reduction in processing overhead resulting from the application of these methods enables executing more simultaneous sessions per server and thereby reduces the number of servers used to service the sessions.

The transcoder/scaler 104 ingests video streams of at least one encoding specification and associated set of encoding parameters and converts them into video streams of an encoding specification compatible with the composited user-interface frames' encoding specification, possibly with a different set of encoding parameters, according to methods disclosed below. Once a video stream has been transcoded and scaled into a format that can be combined with the encoded user-interface fragments, either ahead of time or in real-time, the resulting asset can be reused across a plurality of sessions, again reducing the processing overhead of the application server platform 100.

The interleaver 105 takes frames of the same encoding specification and dimension, but possibly different encoding parameters, from the compositor 103 and transcoder/scaler 104 and temporally orders the frames for sequential output into a compliant stream. An example is illustrated in FIG. 2, which schematically illustrates the interleaving of two frames: a user-interface frame 200 and a frame 210 from a video stream.

The composited user-interface frame 200 contains user-interface controls that may for example include a list control 201 and one or more (e.g., two) buttons 202. The user-interface frame 200 also has a rectangular placeholder 203 (i.e., a placeholder window) for a video window. The placeholder 203 illustrates a transparency grid with a set of macroblocks that may be inter-encoded with a null residual (meaning essentially blank video) or marked as skipped. Hence, any graphical material addressed to the rectangular area of the placeholder 203 in the referenced frame (e.g., the frame 210 from the video stream) will be visible without alterations.

Figure 2:
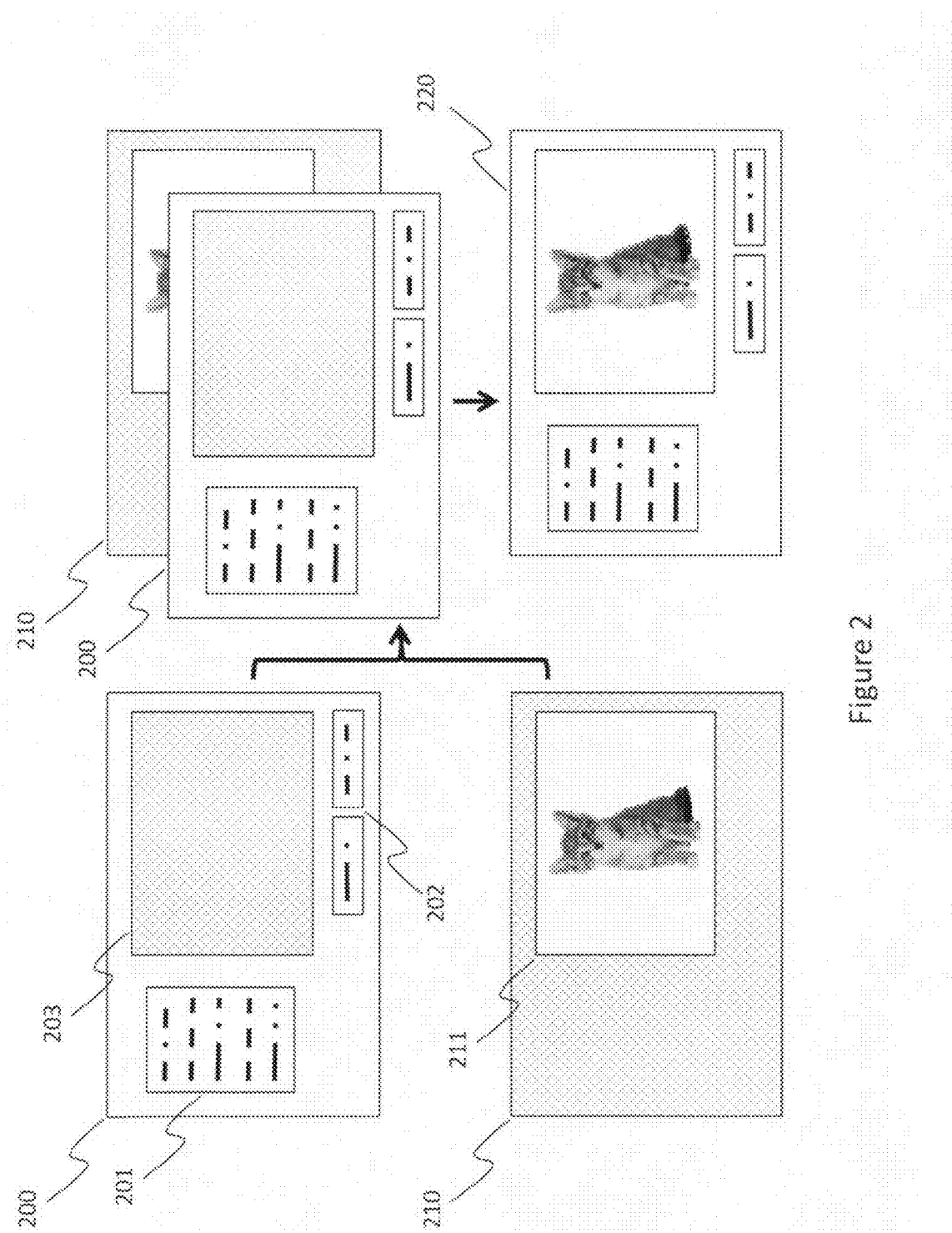
FIG. 2 schematically illustrates a method of interleaving user-interface frames and video frames in accordance with some embodiments.

The video frame 210 in FIG. 2 has an inverted structure. An ingested video stream may be transcoded from one encoding specification to another encoding specification and scaled from one dimension to another dimension, resulting in video 211 that fills the rectangular area of the placeholder 203 in the user interface. The video frame 210 thus contains a transcoded and scaled version of a video stream at a location and with dimensions equivalent to the placeholder 203 in the user-interface frame 200. Any macroblocks of the video frame 210 outside the location of the placeholder 203 are inter-encoded with a null residual or marked as skipped. Hence, any graphical material surrounding (i.e., outside of) the placeholder 203 in the referenced frame (e.g., the user-interface frame 200) will be visible without alterations.

In some embodiments, the transcoded/scaled video stream has the structure shown in FIG. 2, and may be transcoded and scaled ahead of time or in real-time. In other embodiments, video frames 210 padded with null macroblocks may be generated on demand from a transcoded/scaled video stream 211 of exact proportions of the placeholder 203. This may yield an additional flexibility as to where in the frame 210 to place the video stream: transcoding and scaling of the video stream from its source for every new location is avoided, albeit at a slight increase in processing overhead and potential loss in some coding efficiency.

The user-interface frame 200 and the video frame 210 are temporally ordered (i.e., placed in sequence) for sequential display order by the interleaver 105 (FIG. 1) and sent via a downstream network connection 110 to the client device's decoder 121. If the null or skipped macroblocks are encoded to refer to the previous frame in display order, the visual result of interleaving the user-interface frame 200 and the video frame 210 is illustrated in the picture 220, which is perceived to be a single frame. If the method is repeated for each pair of user-interface frames and video frames, for example by ordering the user-interface frames at the even frame numbers and the video frames at the odd frame numbers (or vice-versa), an illusion of an embedded video stream in the user interface is achieved, although at one-half of the full frame rate of a normal broadcast video stream. However, many, if not most, video streams intended for display within a windowed area of a user-interface frame are encoded for playback at half-of-normal frame-rate, in which case there is no loss of temporal quality from the interleaving. Interleaved user-interface frames and video frames are thus transmitted over the downstream network connection 110 from the interleaver 105 to the client device 120.

Figure 3:
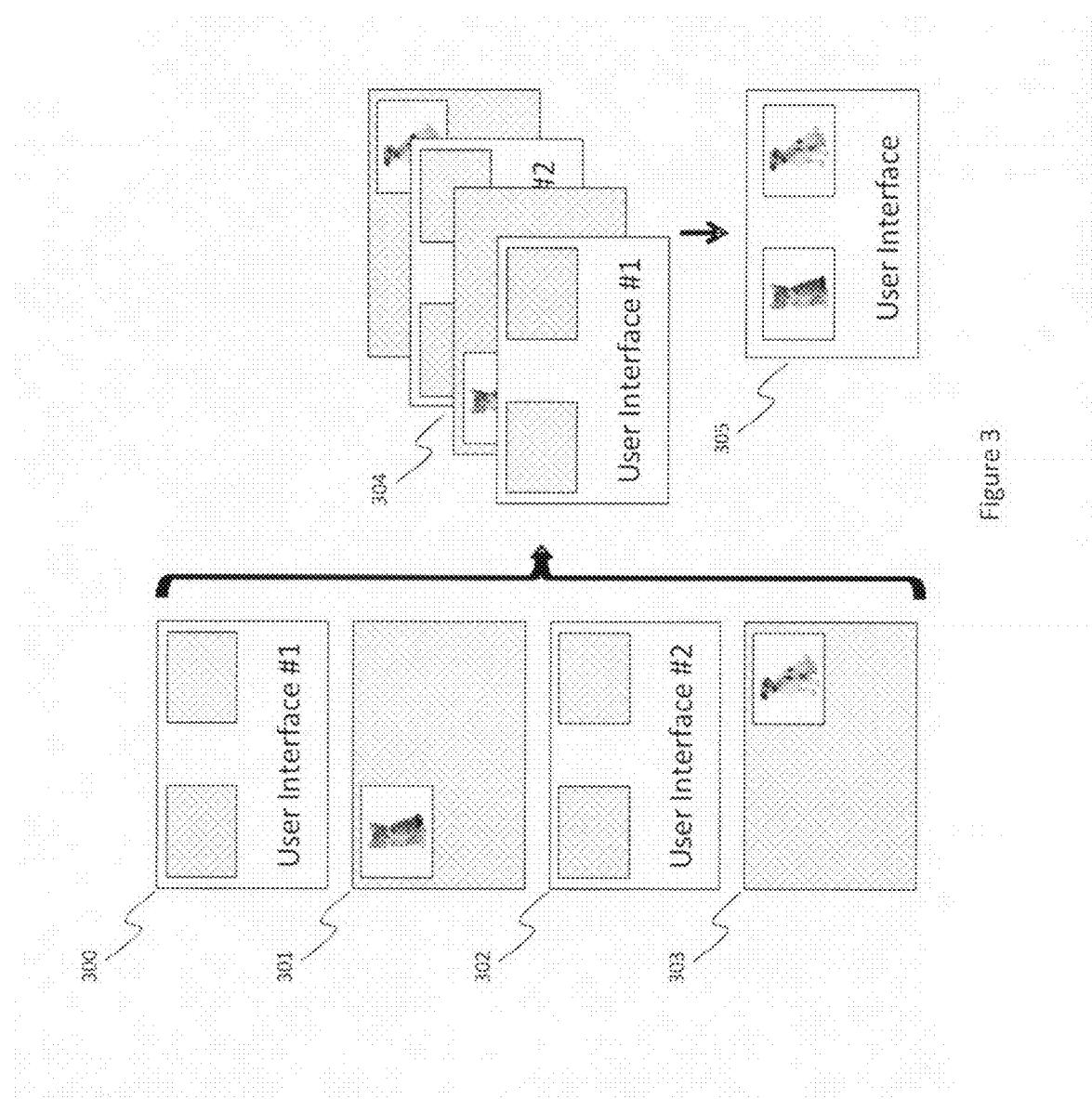
FIG. 3 schematically shows a method of interleaving user-interface frames with video frames from multiple video streams in accordance with some embodiments.

To maintain the frame rate of the user interface and video stream, the interleaver 105 may output a stream at double the rate of the sources. This may, however, not scale beyond a single video stream. A solution may be to run multiple concurrent video streams at a frame rate equal to the source frame rate of the video streams divided by the number of video streams, while keeping the user interface at its source frame rate. In other words, a single video stream may run at full frame rate, two concurrent video streams may run both at half frame rate, three concurrent video streams may run each at a one-third frame rate, etc. Once interleaved, the concurrent video streams may share one half of the interleaved frame rate and the user interface the other half. FIG. 3 illustrates this method: user-interface frames 300 and 302 consume half of the interleaved frame rate, while videos in frames 301 and frame 303 share the remaining half of the interleaved frame rate.

FIG. 3 shows user-interface frames 300 and 302 that have two placeholders for video streams. The user interface runs at a first frequency (e.g., 30 frames per second (fps)); hence, the resulting interleaved stream runs at double the first frequency (e.g., 60 fps). As described above, the two video streams in respective frames 301 and 303 then are available as two streams at half the first frequency (e.g., as two 15 fps streams). Frames 301, 303 for the video streams are interleaved with the user-interface frames 300, 302 (e.g., in an alternating manner) as illustrated in the sequence 304. There are many alternative interleaving methods to choose from. For example, instead of interleaving to a double-frame-rate stream, the interleaved stream may remain at the first rate (e.g., 30 fps) and both the user-interface and the video streams may run at a third of the first rate (e.g., 10 fps). Another example is that instead of running the user interface at the first rate (e.g., 30 fps), one of the video streams may be run at the first rate (e.g., 30 fps), while the user interface and other video stream run at half the first rate (e.g., at 15 fps). Frame rates thus may be chosen such that the frame rates of the user interface and the video streams sum to the frame rate of the interleaved stream. The decision of which interleaving method to choose may depend on, but is not limited to, application policy, content owner policy, infrastructure policy, availability of transcoded assets, end-user preference, etc. The sequence 304 is decoded and displayed (i.e., presented) to the user. The visual result of interleaving the user-interface frame 300 and the video frames 301 and 303 for the two video streams is the picture 305, by analogy to the picture 220 (FIG. 2). The picture 305 is perceived as a single frame.

Figure 4A:
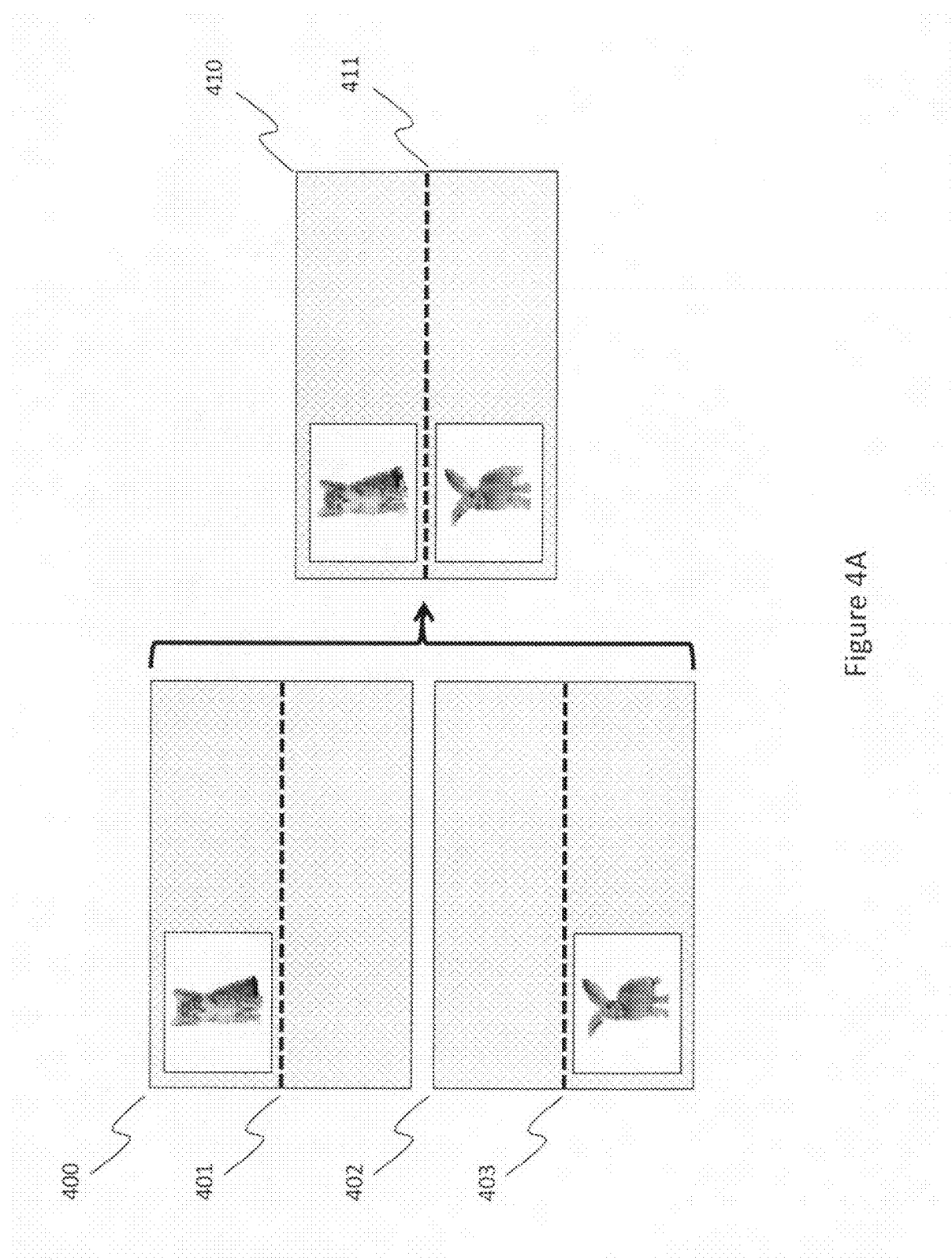
FIG. 4A shows a method of combining separate video streams without directing summing the pixels of each frame, in accordance with some embodiments.
Figure 4B:
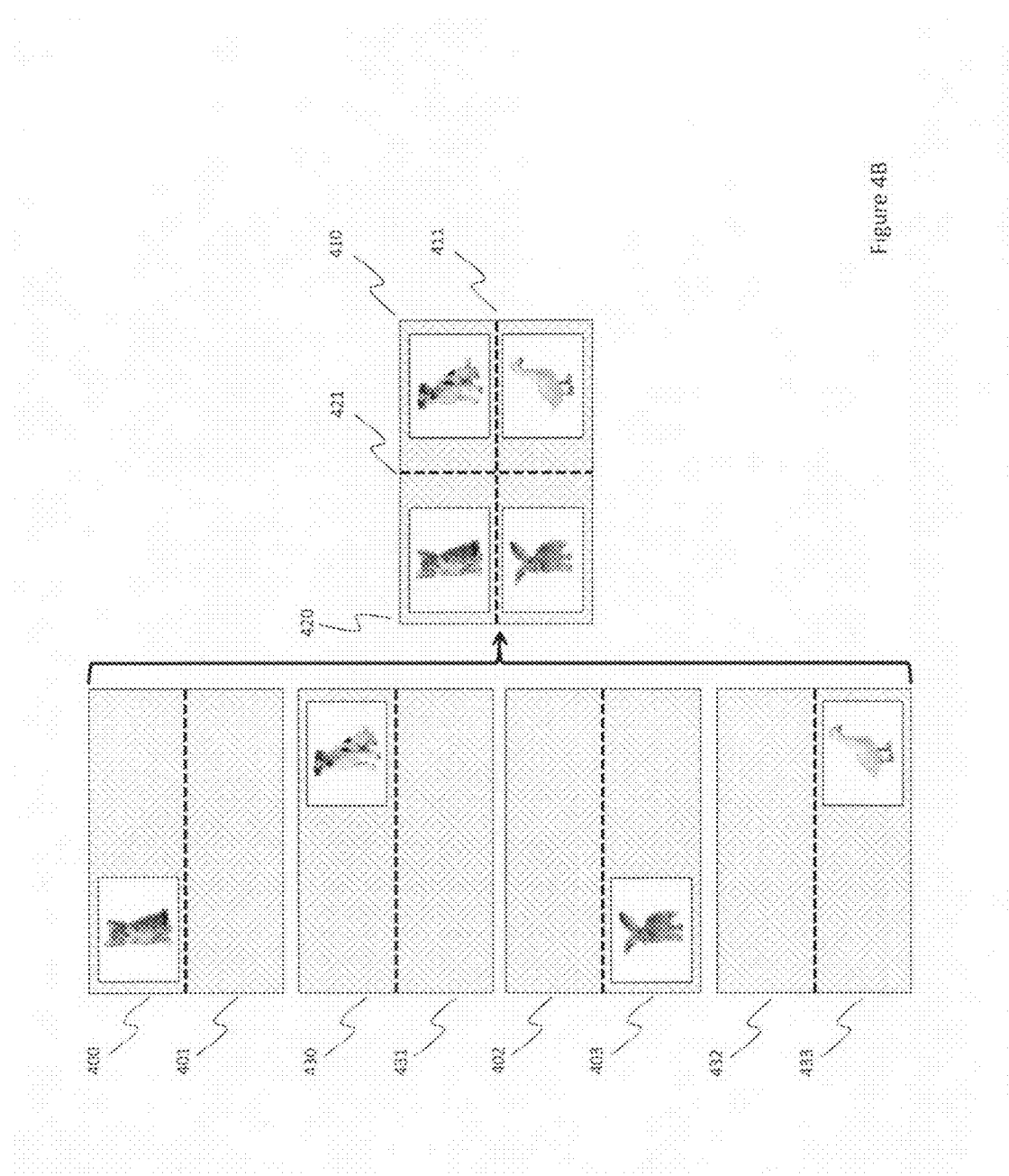
FIG. 4B shows a method of combining separate video sub-frame, or windows, without directing summing the pixels of each frame, in accordance with some embodiments.

FIGS. 4A and 4B illustrate solutions to the problem of how to interleave multiple video streams with a user-interface frame without increasing the interleaved video streams to unpractical frequencies. Frames 400 and 402 (FIG. 4A) are two frames from two respective video streams. The video streams may both have been transcoded and scaled for their respective placeholders and have slice boundaries 401 and 403 (e.g., at identical locations in the frames 400 and 402). As slices are macroblock containers, this allows for a high degree of separation with respect to encoding parameters. Both frames 400 and 402 may be efficiently combined in a single frame 410 by dropping the slice(s) below boundary 411 for frame 400 and the slice(s) above boundary 411 for frame 402, and thus by combining the slice(s) above boundary 411 for frame 400 and the slice(s) below boundary 411 for frame 402. (The location of the slice boundary 411 in the frame 410 corresponds to the locations of the slice boundaries 401 and 403 in the frames 400 and 402.) Accordingly, if two or more video frames are each divided vertically into two or more portions by corresponding horizontal slice boundaries at the same location(s) in each video frame, and each video frame includes a respective video stream in a distinct portion, then the video frames may be combined into a single frame by dropping the frame portions of each frame that do not include video streams. This technique assumes that there is vertical separation between the different video streams and thus between the placeholders for the different video streams. The resulting single frame 410 may then be interleaved with a user-interface frame, by analogy to the interleaving shown in FIG. 3.

For an advanced codec such as, for example, HEVC/H.265/MPEG-H Part 2, this method may easily be extended by leveraging the tile-coding tool of the protocol. Use of tile-coding may avoid the necessity for vertical separation and thus allow horizontal compositing (e.g., in addition to or as an alternative to vertical compositing), as illustrated in FIG. 4B for the frame 420. The frame 420 is composited by combining respective portions of frames 400, 402, 430, and 432. Each respective portion contains a video stream; portions that do not contain video streams are discarded. By applying the vertical separation and/or tiling method and combining frames from concurrent video streams into a single frame, the reduction of frame rate in these situations is avoided. The resulting single frame 420 may then be interleaved with a user-interface frame, by analogy to the interleaving of FIG. 3. The interleaving (and subsequent decoding) results in a picture (i.e., a perceived frame) with all of the video images as well as the features of the user interface.

Figure 5:
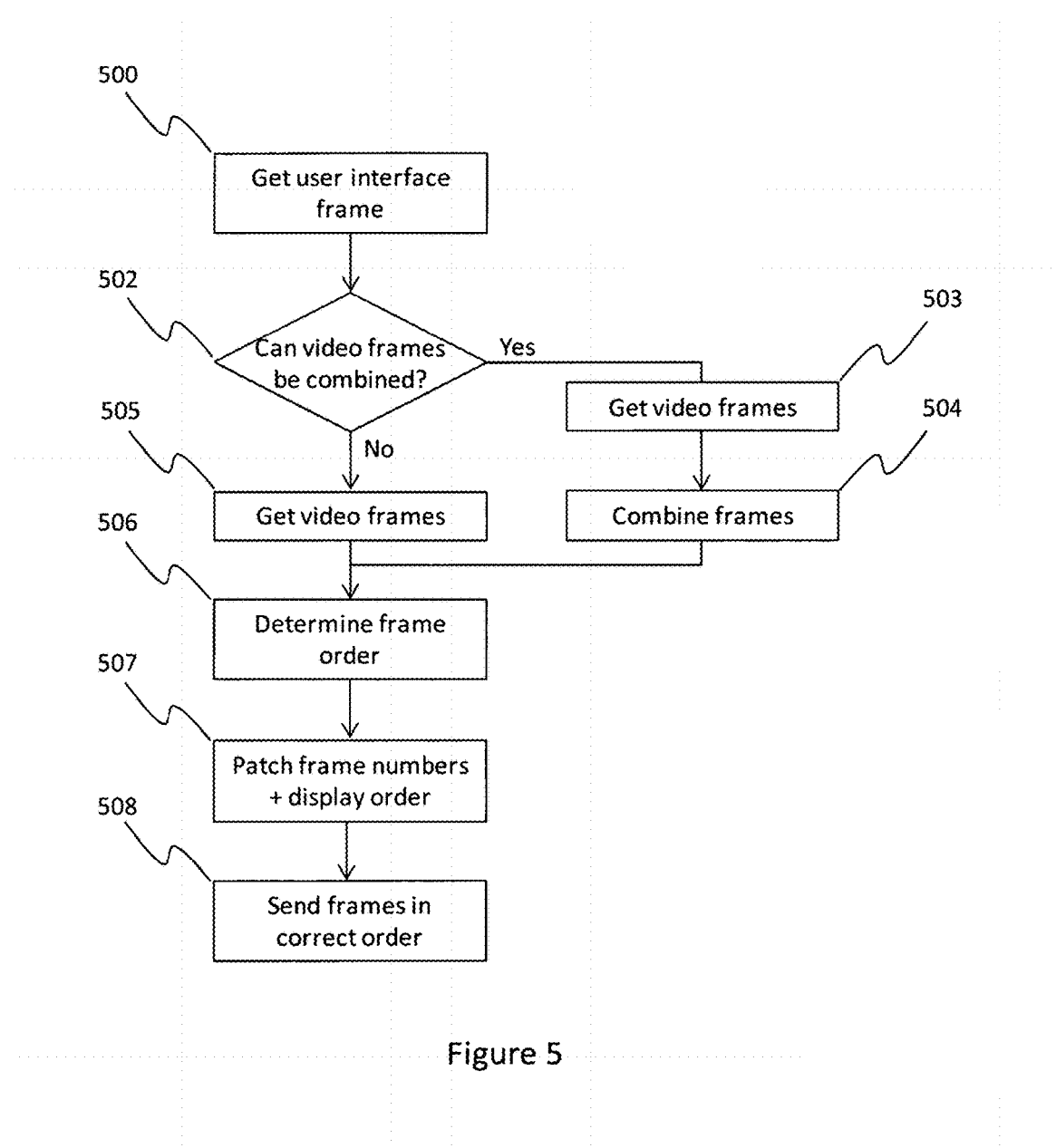
FIG. 5 is a flowchart that shows a method of interleaving user-interface frames with video frames in accordance with some embodiments.

FIG. 5 is a flowchart further representing a method of interleaving in accordance with some embodiments. A user-interface frame is obtained (500) from a compositor (e.g., 103, 703, 803, or 903) or brute-force encoder 602. If the video frames can be combined (502-Yes) (e.g., according to the methods illustrated in FIGS. 4A or 4B), video frames representing different video streams are retrieved from the transcoder/scaler(s) (503) and combined (504) into a single video frame. Conversely, if the video frames cannot be combined (502-No), individual video frames are retrieved (505) from respective sources (e.g., one source at a time in a round robin manner) as illustrated by FIG. 3. The order of the frames resulting from the previous processes is determined (506). If video frames were combined, the frames being ordered include the single video frame produced by process 504 and the user-interface frame. If video frames were not combined, the frames being ordered include the video frames retrieved in process 505 and the user-interface frame. The frame numbers and display order fields are patched (507) in the frames, in accordance with the determined order. The process 506 thus determines the order in which frames are interleaved and the process 507 updates the frame numbers and display order fields to implement the interleaving. The frames are sent out (508) in the interleaved order. In some embodiments, the decision 502 and processes 503 and 504 are omitted.

For certain encoding specifications, such as for example H.264/MPEG-4, the interleaving method has a low processing overhead. Besides the advantage of a low processing overhead, there may be several other advantages. H.264/MPEG-4 AVC may achieve much of its coding efficiency gains over MPEG-2 by using coding tools that may not allow for the spatial composition of already encoded fragments. Therefore, the encoded fragments may generally be encoded with encoding parameters that may disable certain coding tools. Examples of H.264/MPEG-4 coding tools that may otherwise help increase the fidelity of the video material or conversely reduce the bitrate of the video material for similar fidelity, but that may not be compatible with the spatial composition of already encoded fragments, may be: the application of context adaptive binary arithmetic coding (CABAC), unconstrained intra prediction, weighted prediction, slices and intra prediction modes spanning multiple macroblock rows, and application of the deblocking filter, among others. By temporally separating video frames from user-interface frames, the encoding parameters of the frames may also be separated and coding tools may be used for the video material that otherwise may not be available. Another coding tool that is not used in a system that composites video material into a user interface, at least not without increasing latency, is the application of bi-directional predicted inter-encoded frames (B-frames). B-frames may allow effective interpolation between future and past frames. Interpolating from future frames requires frames to be sent ahead, which increases latency for the user interface. By temporally separating video material from user interface material, the use of B-frames is possible.

Figure 6:
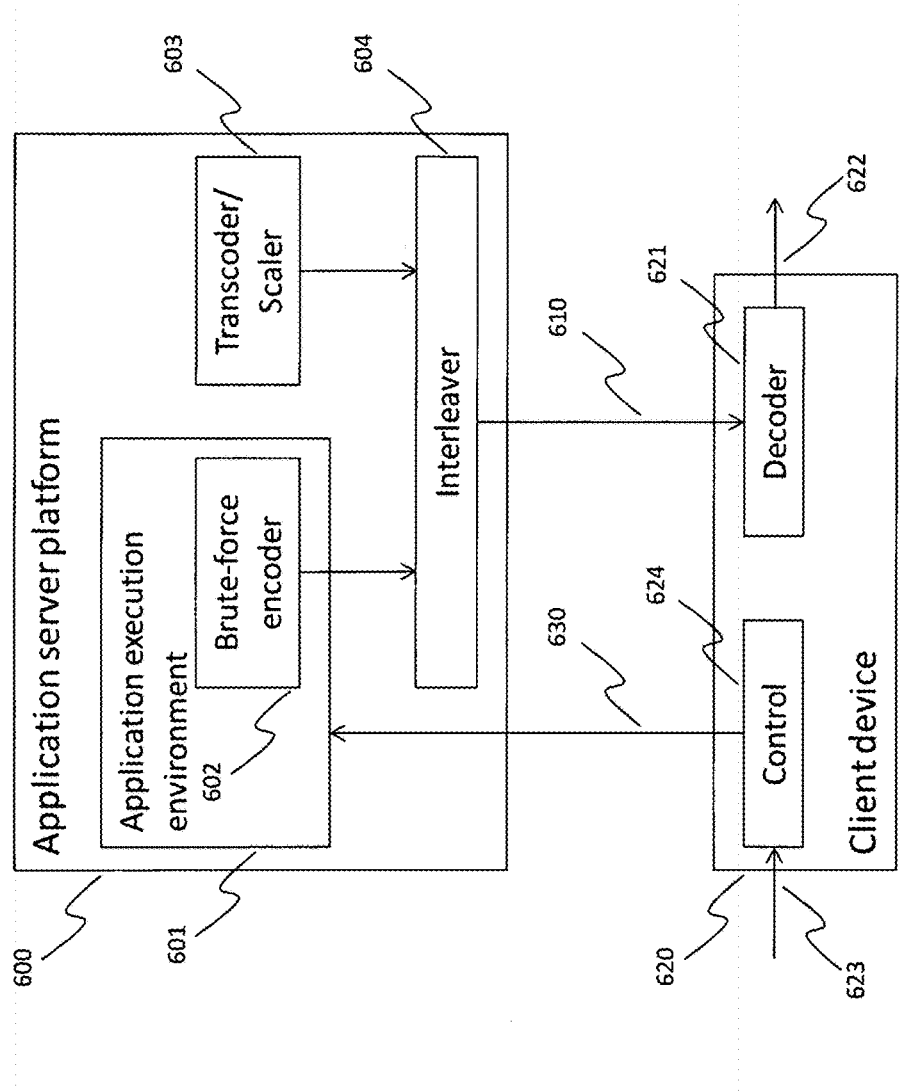
FIG. 6 is a block diagram that shows a system in which the fragment encoder of FIG. 1 is replaced by a brute-force encoder, in accordance with some embodiments.

FIG. 6 shows a system in which the fragment encoder has been replaced by a so-called brute-force encoder 602, in accordance with some embodiments. Since the brute-force encoder typically outputs complete frames, a compositor is omitted. For a user interface that is relatively static or refrains from employing elaborate animations, brute-force encoding of the user interface may be a viable solution because relatively few frames are actually encoded. For those frames that do not change, the frame encoding step may be skipped by simply substituting an encoded frame with a null-frame (i.e., an inter-encoded frame, referencing the last encoded frame in display order, that contains only inter-encoded macroblocks with null residuals or macroblocks marked as skipped.) Null frames may not change the encoder's state, so the encoder's state may not have to be updated or updates to the encoder's state may be relatively cheap from the perspective of computing resources. For brute-force software encoders, the processing overhead reduction may immediately be of benefit to the entire system due to the nature of time-sharing of the CPUs or CPU cores by various CPU processes or software threads. For hardware encoders, benefits may be achieved by sharing hardware encoders between sessions, thereby preventing the encoders from idling, hence increasing the number of sessions that can be handled per server. However, when a brute-force encoder embeds video streams, those video streams may first be decoded, scaled and then spatially combined with the user interface in the frame buffer. Since this is done at full frame rate, the aforementioned benefits may not apply and brute-force encoding may not be an attractive approach. The interleaver 604 may remedy this situation by combining the brute-force-encoded user interface and the encoded video streams temporally with methods as described above (e.g., for FIGS. 1-3 and 5), instead of spatially combining the decoded frames within the frame buffer and subsequently encoding the contents of the frame buffer for each frame.

The brute-force encoder 602 thus outputs to the interleaver 604, which interleaves frames from the brute-force encoder 602 and the transcoder/scaler 603 and sends the interleaved frames to the client device 620.

Figure 7:
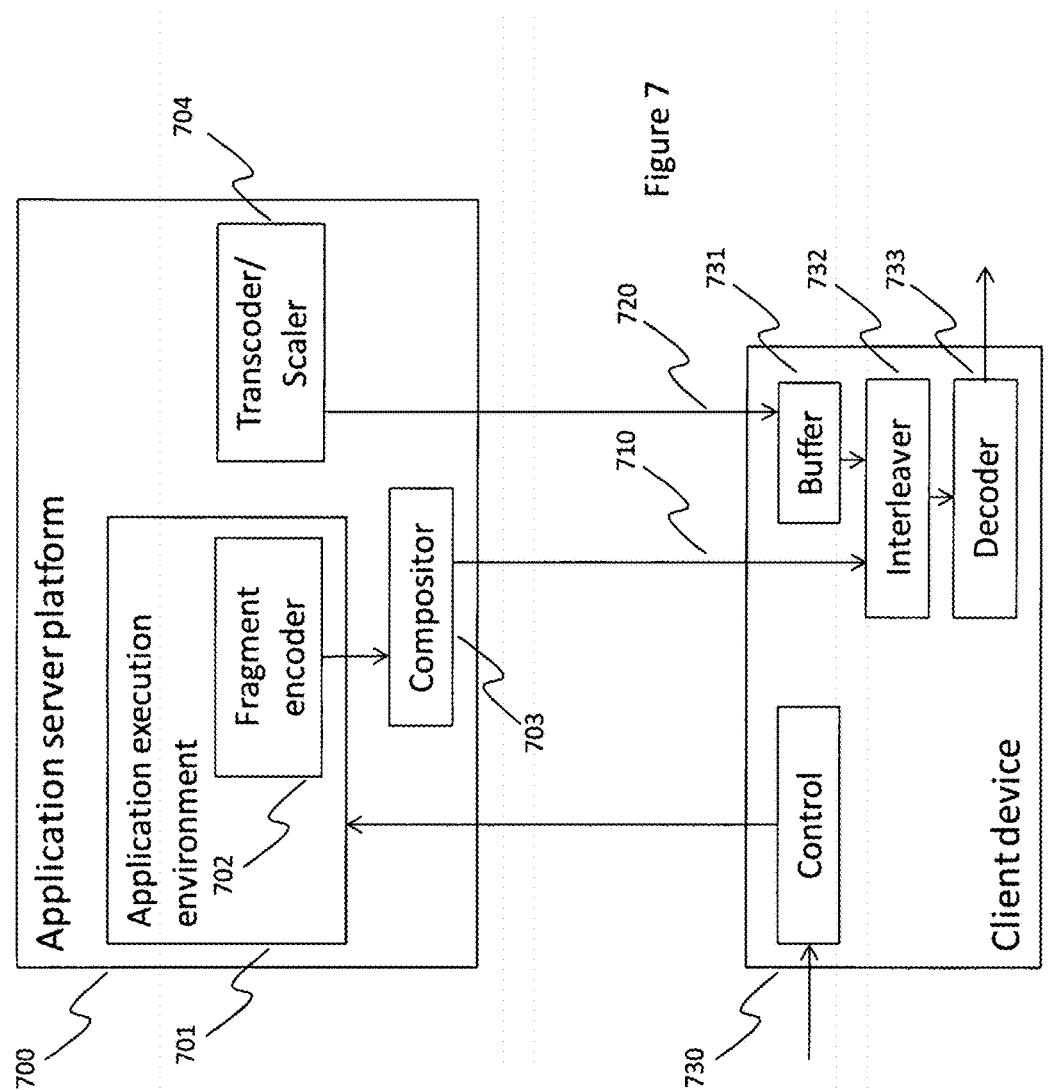
FIG. 7 is a block diagram showing a system in which an interleaver residing in a client device receives independent compliant video streams from a server-side compositor and transcoder, in accordance with some embodiments.

FIG. 7 shows a system in which the interleaver 732 is in the client device 730 instead of the application server platform 700, in accordance with some embodiments. The interleaver 732 uses one or more downstream network connections 710, 720 to retrieve frames from the server-side compositor 703 and transcoder/scaler 704. The interleaver 732 interleaves the frames and provides them to a decoder 733, which decodes the interleaved frames and provides output to a display device for display. Other components remain as in the system of FIG. 1. In other embodiments, the fragment encoder and compositor may be replaced by a brute-force encoder, similar to the system schematically illustrated in FIG. 6.

Interleaving in the client device 730 may be advantageous for systems where the downstream network connection(s) may be in part unmanaged networks such as the Internet. The unmanaged character of these networks may manifest itself in temporal non-deterministic behavior with respect to available bandwidth, delay, and/or loss properties. The video streams may benefit from a relatively high degree of client-side buffering in order to be robust to temporal variations with respect to these properties, while the user interface stream may be best served by a shallow buffer or no buffer. A buffer for the user-interface stream (i.e., the stream from the compositor 703) thus either is absent from the client device 740, as shown in FIG. 7, or is present but smaller than (i.e., of lower capacity than, and thus shallower than) the buffer 731 for the video streams. By interleaving at the client side, frames from both sources may be independently retrieved from the server. The user-interface frames are interleaved and output to the decoder 733 on availability, while the video streams are first put into the buffer 731 and then interleaved and output to the decoder 733. The client device 730 thereby appropriately manages the temporal variations that may otherwise lead to under-flows of the decoder 733.

Figure 8:
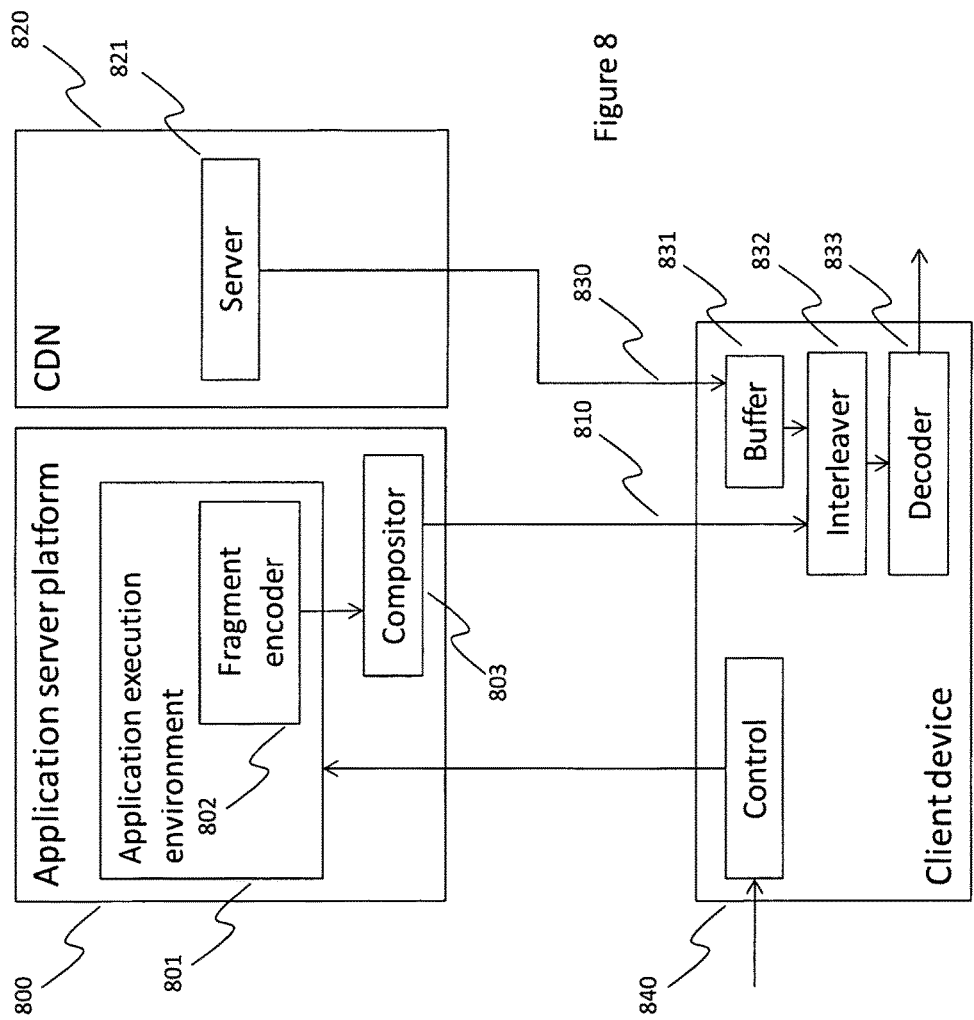
FIG. 8 is a block diagram of a system in which a client-side interleaver receives compliant video streams from a server-side compositor and a content-delivery network in accordance with some embodiments.

FIG. 8 schematically shows a variation to the system of FIG. 7, in accordance with some embodiments. The transcoder/scaler 603 is replaced by a third-party content-delivery network (CDN) 820 and associated downstream network connection 830. A server 821 of the CDN 820 provides video streams of the required encoding specification and encoding parameters to the client device 840 to be interleaved on the client device 840. A client-side interleaver 832 receives compliant video streams from the CDN 820 (as buffered in a client-side buffer 831) and a server-side compositor 803, and interleaves frames from the video streams. A client-side decoder 833 decodes the interleaved frames and provides output to a display device for display.

Figure 9:
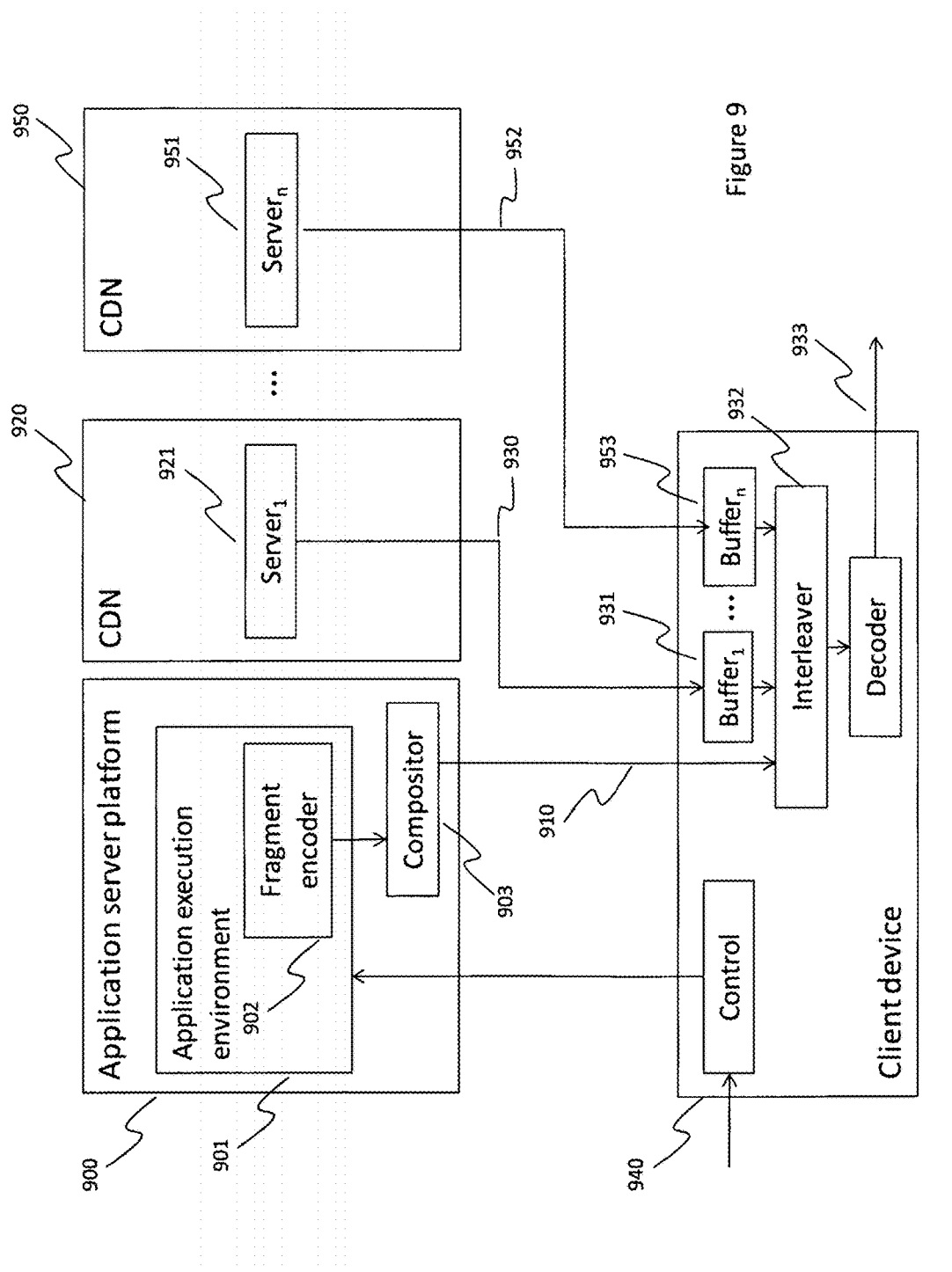
FIG. 9 is a block diagram of a system in in which a client-side interleaver receives compliant video streams from a server-side compositor and multiple content-delivery networks in accordance with some embodiments.

FIG. 9 schematically shows yet another variation to the system of FIG. 7, in accordance with some embodiments. The transcoder/scaler 603 is replaced by multiple third party CDNs 920 and 950 and associated downstream network connections 930 and 952, which provide video streams of the required encoding specification and encoding parameters to the client device 940 to be interleaved on the client device 940. A client-side interleaver 932 receives compliant video streams from the CDNs 920, 950 (as buffered in respective client-side buffers 931, 953) and a server-side compositor 903, and interleaves frames from the video streams. A client-side decoder decodes the interleaved frames and provides output 933 to a display device for display.

In some embodiments, the encoding specification may be an MPEG specification, an AVS specification, an H.264/AVC or a VC-1 specification, or any other video encoding specification.

In some embodiments the downstream network connection may be through a managed infrastructure, such as a cable television system, using quadrature amplitude modulation (QAM), or using user datagram protocol via internet protocol (UDP/IP) using an internet protocol television (IPTV) infrastructure.

In some embodiments the downstream network connection may be through an unmanaged infrastructure using user datagram protocol over internet protocol (UDP/IP), or transmission control protocol over internet protocol (TCP/IP), or hypertext transfer protocol (HTTP) over TCP/IP using a public or private internet infrastructure.

In some embodiments the client device may be a cable or satellite set-top box or a broadband-connected device for receiving video entertainment via the Internet, among others.

Software Implementations

Components of an application server platform may be implemented in hardware, software, or a combination of hardware and software. Attention is now directed to embodiments in which at least some components are implemented in software.

Figure 10:
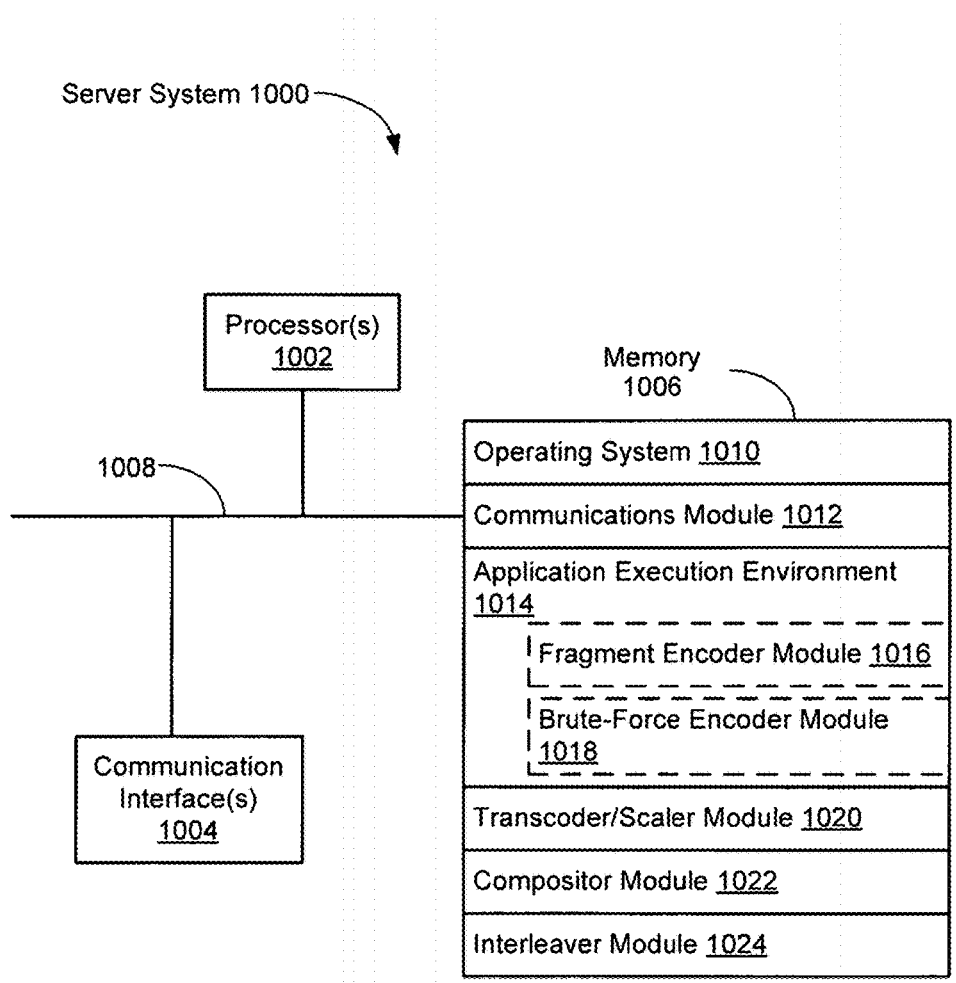
FIG. 10 is a block diagram of a server system in accordance with some embodiments.

FIG. 10 is a block diagram of a server system 1000 in accordance with some embodiments. The server system 1000 is an example of an application platform server 100, 600, 700, 800, or 900. The server system 1000 includes one or more processing units (e.g., CPU processors or CPU cores) 1002, one or more network or other communications interfaces 1004, memory 1006, and one or more communication buses 1008 for interconnecting these components. The communication buses 1008 optionally include circuitry that interconnects and controls communications between system components.

Memory 1006 includes volatile random-access memory (e.g., DRAM, SRAM, etc.) and non-volatile memory (e.g., flash memory, hard-disk drives, etc.). Memory 1006 may optionally include one or more storage devices remotely located from the processor(s) 1002. Memory 1006, or alternately the non-volatile memory device(s) within memory 1006, includes a non-transitory computer-readable storage medium. In some embodiments, memory 1006 or the computer-readable storage medium of memory 1006 stores the following modules or a subset or superset thereof:

- an operating system 1010 that includes procedures for handling various basic system services and for performing hardware-dependent tasks;
- a network communication module 1012 that is used for connecting the server system 1000 to other electronic devices (e.g., client devices) via the one or more communication network interfaces 1004 and one or more communication networks;
- an application execution environment 1014, including:
  - a fragment encoder module 1016, and/or
  - a brute-force encoder module 1018;
- a transcoder/scaler module 1020;
- a compositor module 1022; and/or
- an interleaver module 1024.

The modules and applications of FIG. 10 correspond to software (e.g., one or more programs) that is executable by the one or more processing units 1002. Each of the modules 1014, 1016, 1018, 1020, 1022, and 1024 includes a set of executable instructions for performing the functions of a corresponding component of an application server platform.

A non-transitory computer-readable storage medium in the memory 1006 thus may include instructions for performing all or a portion of the method of FIG. 5. These modules (i.e., sets of instructions) need not be implemented as separate software programs, procedures or modules, and thus various subsets of these modules are, optionally, combined or otherwise re-arranged in various embodiments. In some embodiments, memory 1006 stores a subset of the modules identified above. Furthermore, memory 1006 optionally stores additional modules and data structures not described above.

Figure 11:
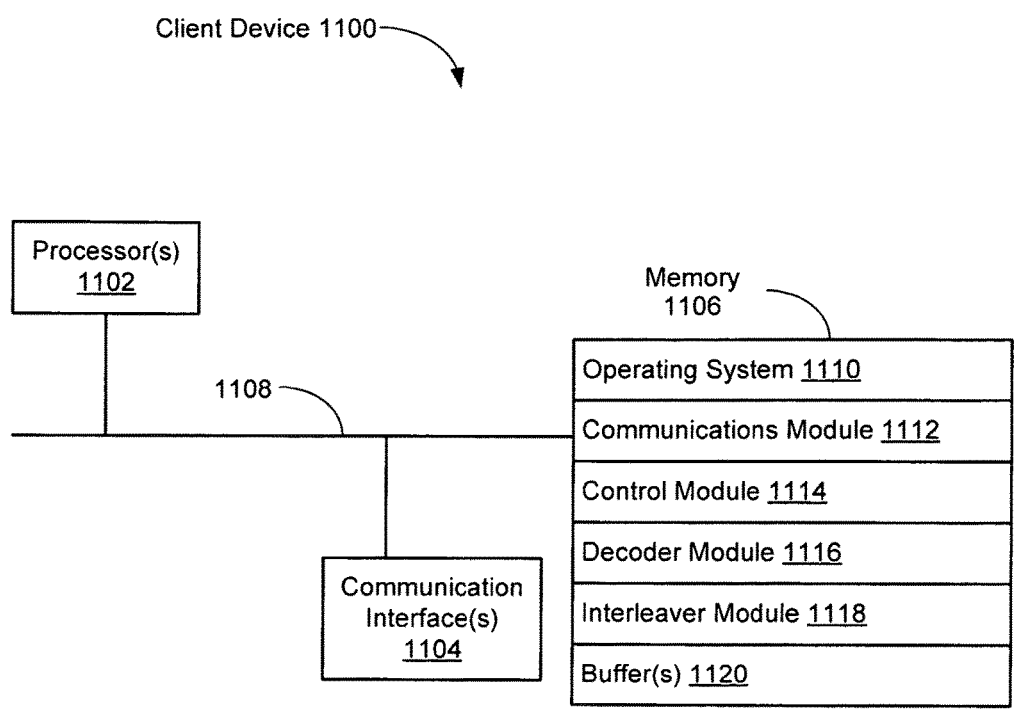
FIG. 11 is a block diagram of a client device in accordance with some embodiments.

FIG. 11 is a block diagram illustrating a client device 1100 in accordance with some embodiments. The client device 1100 is an example of a client device 120, 620, 730, 840, or 940. The client device 1100 includes one or more processing units (processors or cores) 1102, one or more network or other communications interfaces 1104, memory 1106, and one or more communication buses 1108 for interconnecting these components.

Memory 1106 includes volatile random-access memory (e.g., DRAM, SRAM, etc.) and non-volatile memory (e.g., flash memory, a hard-disk drive, etc.). Memory 1106 may optionally include one or more storage devices remotely located from the processor(s) 1102. Memory 1106, or alternately the non-volatile memory device(s) within memory 1106, includes a non-transitory computer-readable storage medium. In some embodiments, memory 1106 or the computer-readable storage medium of memory 1106 stores the following programs, modules and data structures, or a subset or superset thereof:
- an operating system 1110 that includes procedures for handling various basic system services and for performing hardware dependent tasks;
- a network communication module 1112 that is used for connecting the client device 1100 to other computers via the one or more communication network interfaces 1104 and one or more communication networks;
- a control module 1114;
- a decoder module 1116;
- an interleaver module 1118; and/or
- one or more buffers 1120.

The modules and applications of FIG. 11 correspond to software (e.g., one or more programs) that is executable by the one or more processing units 1102. Each of the modules 1114, 1116, and 1118 includes a set of executable instructions for performing the functions of a corresponding component of client device. A non-transitory computer-readable storage medium in the memory 1106 thus may include instructions for performing at least a portion of the method of FIG. 5. These modules (i.e., sets of instructions) need not be implemented as separate software programs, procedures or modules, and thus various subsets of these modules are, optionally, combined or otherwise re-arranged in various embodiments. In some embodiments, memory 1106 stores a subset of the modules identified above. Furthermore, memory 1106 optionally stores additional modules and data structures not described above.

Benefits of Interleaving

Interleaving of user interface and video frames as disclosed herein avoids a limitation associated with pure spatial compositing techniques: spatial compositing may limit the number of coding tools that may be used to increase coding efficiency without incurring a considerable processing overhead penalty. For example, H.264/MPEG-4 AVC achieves much of its efficiency gains over MPEG-2 by using coding tools that may not allow for the spatial composition of already encoded fragments. One such method may be the type of entropy encoding used to encode the composited frame. Fragments may only efficiently be composited by using context-adaptive, variable-length coding (CAVLC), while the best coding efficiency that provides lower bandwidth or higher quality for similar bandwidth, may be achieved by employing context-adaptive binary arithmetic coding (CABAC). Combining CAVLC encoded material with CABAC encoded material may be achieved by temporal combination or interleaving of the composited-and-CAVLC-encoded user-interface frame with the CABAC-encoded video stream(s).

Interleaving of user-interface frames with embedded video streams may also yield other advantages. For example, in a user interface that is relatively static or refrains from employing elaborate animations, the overhead of the composition of the embedded video stream in the static user interface is the dominant processing load. By interleaving the embedded video stream with the user interface, there may be little or no compositing overhead when the user interface remains static. Another advantage of interleaving the user interface and video streams may be for applications where the user interface is not based on encoded fragments but is more akin to a so-called brute-force encoded interface. For applications with a relatively static user interface, the cost of brute-force encoding only those frames that actually change may be acceptable. However, if such a user interface includes embedded video streams that are spatially combined with the otherwise static user interface, each frame may have to be encoded after all. Interleaving the occasional brute-force-encoded frame with the embedded video streams may allow for such a system to be realized in a far more computationally efficient manner.

Interleaving may yield another advantage for systems running over unmanaged networks such as the public Internet. It may be advantageous to have different buffering or latency properties for the user interface and the embedded video streams. The unmanaged character of these networks may manifest itself in temporal non-deterministic behavior with respect to available bandwidth, delay, and/or loss properties. The video part of the composited stream may benefit from a relatively high degree of client-side buffering in order to better handle temporal variations in these properties, while the user interface part may be best served by a shallow buffer. However, when the user interface and video are spatially combined, the amount of buffering that the system uses may be a compromise that attempts to balance these requirements, because the user-interface frames cannot be buffered separately from the video frames. Client side interleaving allows for decoupling of these buffer strategies: more buffering may be used for video frames than for user-interface frames.

Interleaving may yield another advantage for systems running over unmanaged networks such as the public Internet. Multiple video sources may be encoded such that each occupies a different portion of a video display area. For example, two separate video sources may be encoded such that each occupies a different portion (e.g., opposite halves) of a video display area (e.g., one occupies the left half and the other occupies the right half, and/or one occupies the top half and the other occupies the bottom half). Similarly, four separate video sources may be encoded such that each occupies a different portion (e.g., a different quadrant) of the video display area. These separate video streams may be interleaved relative to the number of streams such that the resulting image as displayed on a commercial television receiver appears as one frame of the composite of the number of streams participating. The temporal resolution is reduced proportionately to the number of streams interleaved by this process.

Attention is now directed to methods of operating the fragment encoder and compositor. These methods are also described in U.S. patent application Ser. No. 12/443,571, published as US 2010/0146139 A1, which is incorporated by reference herein in its entirety.

Fragment Encoder Operation

Inputs to the fragment encoder include sequences of one or more pictures, each comprising picture shape description, pixel values and a texture mapping field. Texture mapping fields describe the manner in which picture points or pixels are used in the reference pictures. Per pixel or pixel block the texture mapping field describes whether pixels of the texture map are being reused and if so whether the vectors used for these pixels are added or subtracted.

Encoded fragments are produced in the fragment encoder with codes for efficiently combining these encoded fragments with other encoded fragments. For this purpose extensions are present in the fragment encoder. Although the number of degrees of freedom for the fragment encoder is limited, the fragment encoder gives advantages by way of for example applying constant parameters for all encoded fragments, such as in the quantization matrix using MPEG-2.

By carefully choosing encoded parameters on picture level, such as picture order, picture type, movement vector ranges, frame/field and slice structure, these can be compatible with encoded fragments that are meant to be merged at a later stage. The slice structure is substantially defined by the picture shape.

When picture information is supplied to the fragment encoder 22 it can be indicated which pictures are meant for later merging thereof or meant for, for example, use with each other in time and based on this for facilitating the choice of suitable encoding parameters. Alternatively, global parameters can be set by the application logic for the session or for a number of similar sessions. According to a further embodiment, the fragment encoder maintains a number of states, comprising encoding parameters, for previously encoded fragments and subsequently determines parameters relating to these states. According to a further embodiment, the conflict resolution is solved in the compositor (which may also be called an assembler) without control based on parameters coming from the application logic (i.e., logic in the application execution environment). This conflict resolution will be described below, together with the description of the assembler and its use.

During operation, the fragment encoder reads pixels and texture mappings. Such a texture mapping or texture mapping field acts as a definition for picture shape description, pixel values, and how the pixels in the reference pictures need to be used. In a pixel or pixel block (such as in macro block) the texture mapping field describes whether pixels are reused out of the texture map and if so, possible vectors that can be used for these pixels and possibly whether pixel values need to be added or subtracted. This enables the realization of 2D movement of the blocks of texture pixels. Since fragment pictures that are decoded can be incorporated in the reference pictures as well, the process can be interactive which enables processing of texture mappings on the same pixels in consecutive pictures.

The picture restructuring, the picture type and the parameters are then set. The picture order and picture/slice types as well as macro block types are derived from the texture mapping field. The picture order is determined by the order in which textures and pixels need to be used. In the situation wherein macro blocks re-use texture pixels, preferably the macro blocks are inter-frame encoded and the movement vectors are determined by the texture mapping field. If macro blocks do not reuse texture pixels and are determined by the pixel values that are provided for input, the macro block is intra-frame coded.

Next, the reference pictures and picture shape and slice structure are set. The number of slices may not be minimized, but fragments are encoded in view of optimizing the encoding of slices depending on the picture elements to be displayed in view of the codec. In the case of codecs that do not need a new slice per horizontal macro block line, such as for example H.264, it is important that the encoder functions correctly in relation to fragments. If for example other fragments are standing together on a macro block line at the left or right side of a predetermined fragment, this is based on the encoded meta information. For example with mpeg-2 one new slice per horizontal macro block line is needed.

In the assembler (i.e., compositor), whole slices can be replaced or deleted from a picture frame. In the meta information to be encoded such additions or replacements are not taken into account in the assembler when additional slices need to be placed. Such a method is helpful when filling certain areas in a background picture by means of other fragments. Also non-rectangular pictures can be applied herewith by using many slices when no actual macro blocks of picture information is provided in a picture frame. Such non rectangular pictures or parts thereof are visible when picture information is projected over a background.

Next the fragment encoder checks, for each macro block, whether the type of macro block and/or movement vectors are prescribed by the process of the texture mapping. In other words, it is checked what the answer is to the question 'texture mapped?'. If this is the case the macro block type and movement vectors are derived based on the texture mapping vectors. If this is not the case an algorithm for the macro block type definition and the movement estimation can be executed similar to a known encoder.

If it is determined that the texture mapping is performed, then it is checked whether the pixels are defined. If this is not the case then known processes such as movement compensation, transformation (such as DCT in the case of MPEG-2) and quantization are executed. The setting of the quantizer can be set externally. This enables for example a higher quality of encoding for synthetic text as compared to natural pictures. Alternatively, the fragment encoder determines a suitable quantizer setting based on the bit rate to be applied for the encoded fragment for the display of the user interface for which the method is performed.

Next the variable-length encoding of the output is determined. With this the headers of the slices, parameters of the macro blocks and the block coefficients are VLC-coded in a way suitable for the codec applied, and are executed. These steps are repeated for each macro block of each slice.

If necessary for executing the texture maps, reference pictures are actualized by means of inverse quantization and/or movement compensation and optional post processing in the loop. These new reference pictures are applied for next pictures in the fragment.

Next, it is determined whether there is a next picture to be encoded in which case the method returns back to setting the picture restructuring, the picture type, and the parameters. If the last picture is inter-frame coded, for which a last received inter-frame encoded picture is not shown on the screen of the user for reasons of the reference character, then at the end of the method for processing pictures for the encoded fragment an additional picture indicating no changes is generated. The method of operating the fragment encoder then ends.

Fragments encoded by the fragment encoder may be stored in a fragment cache. This cache functions for storage of encoded fragments and the distribution thereof over the different user interface sessions that are generated by the assembler. A second function of the fragment cache is the distribution of fragments of live streams that are not stored in the fragment cache if they are not reused but that can be used in parallel in sessions at the same moment. For this parallel use of fragments, the fragment cache functions to forward and multiply the picture information.

Compositor Operation

The compositor 103, 703, 803, 903, 1022 (i.e., assembler) composes a video stream (e.g., of user-interface frames) out of the fragments that are encoded in the fragment encoder (e.g., stored fragments in the fragment cache). For this, inputs in the fragment composer comprise fragments and positioning information for the fragments.

For the pictures to be displayed, fragments applicable in the video stream and the slices that make up the fragments and related picture parameters are input in the assembler. A check is made for whether active fragments and/or slices are present. If there are no active fragments present, then a 'no change picture' is generated by the assembler. A selection is made out of the following possibilities. The assembler generates an actually fitting picture in which no changes are coded. Alternatively no data is generated. With this it is assumed that if the buffer at the decoder becomes empty, the picture will freeze and no changes will be displayed. This will reduce network traffic and will improve reaction times.

It is determined whether there are active fragments. If this is the case, picture parameters are determined. If there is one active fragment, the associated picture parameters can be applied for the picture to be displayed. If there are more fragments active, it is checked whether all picture parameters that are used for encoding of the parameters are compatible. Relevant parameters for this are picture order, picture type, movement vector range (such as f-codes), etc.

If it is determined that active slices of fragments are present in the input information, then it is determined whether conflicting picture parameters exist. If this is the case then a kind of conflict resolution is used as will be described in greater detail below.

Several embodiments of the method for handling such conflicts exist among which are the following: the fragments with conflicting parameters can be encoded again; furthermore, conflicts relating to parameters of fragments are solved by, for example, ranking, duplication, dropping or delaying thereof. Although some deviations may occur, these will hardly be noticed by the user as a result of, for example, very short display times of such artifacts. A major advantage of such conflict handling is that it uses little computational power and can therefore be performed for many sessions in parallel. A practical example is that when different encoded fragments apply different MPEG P-frame and B-frame picture sequences, this can be resolved by duplicating the B-frame pictures or removing the frames from a part of the encoded fragments.

Slices are repositioned to correct X and Y positions on the display. A purpose for this is that the graphical user interface is optimized by the video codec and/or display resolution that is used in the session. It is, for example, advantageous that if picture elements in the renderer are tuned to the position of macro blocks or slices or lines on which these can be aligned. The information relating to the determined X and Y positions are placed in the headers of the slices. In this way a repositioning can be performed using relatively little computational power by only writing other positioning data in the header of the slices.

After the repositioning, slices and/or fragments are sorted on the X and Y position, preferably first in the Y position and next in the X position in order in which these will be applied in the used codec. It may occur that slices and/or fragments overlap. In that case, conflict solving is performed. With this conflict solving, it is possible that background slices that are fully overlapped by foreground slices are deleted. If multiple foreground slices overlap according to the present invention a picture-splitting algorithm can be used to obtain two or more pictures instead of one. Each picture has its own picture parameters or slice parameters and they will be shown in sequence. The visual effect of such an intervention is again hardly noticeable by the human eye. This enables the interleaving of two or more fragments. Alternatively, it is possible that the fragment encoder combines slices using pixel and texture mapping information of the macro blocks to produce a combined result.

Openings or empty spaces in the picture are filled when these are not filled by a slice. For this purpose, one or more slices are defined for the empty spaces such that slices do not require further processing in order to utilize macro blocks from the slices. Next picture headers, comprising, for example, picture parameters, are defined and similar to the sorted slices, are processed in a serial manner in the shape of an encoded picture and stream corresponding to the video standard used for the session of the user interface.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

I claim:

1. A method of displaying video embedded in a user-interface, the method comprising, at an electronic device having one or more processors and memory storing instructions configured for execution by the one or more processors:
   obtaining user-interface frames having a first placeholder for a first video window;
   obtaining source video frames having a first video stream in alignment with the first video window;
   interleaving the source video frames with the user-interface frames to form an output video stream, wherein:
      the interleaving comprises:
         determining a temporal order of the user-interface frames and the source video frames in the output video stream for sequential display;
         updating frame numbers and display order fields of the source video frames and the user-interface frames in accordance with the determined temporal order; and
         forming the output video stream in accordance with the determined temporal order, wherein, in the output video stream:
            the source video frames are output in the output video stream at a first rate, and the user-interface frames are output in the output video stream at a second rate that is distinct from the first rate; and providing the output video stream in the determined temporal order for decoding and display.

2. The method of claim 1, wherein:
macroblocks in the user-interface frames inside the first placeholder are inter-encoded with a null residual or marked as skipped; and
macroblocks in the source video frames outside of the first video window are inter-encoded with a null residual or marked as skipped.

3. The method of claim 1, wherein the user-interface frames include user-interface controls outside of the first placeholder.

4. The method of claim 1, wherein:
the electronic device is a server system; and
obtaining the user-interface frames comprises:
  encoding graphical material into user-interface fragments; and
  compositing the user-interface fragments.

5. The method of claim 1, wherein:
the electronic device is a server system; and
obtaining the user-interface frames comprises performing brute-force encoding of complete user-interface frames.

6. The method of claim 1, wherein:
the electronic device is a server system; and
obtaining the source video frames comprises:
  transcoding the first video stream from a first encoding specification to a second encoding specification; and
  scaling the first video stream from first dimensions to second dimensions, wherein the second dimensions correspond to dimensions of the first placeholder and the first video window.

7. The method of claim 1, wherein:
the electronic device is a client device further comprising a first buffer; and
obtaining the source video frames comprises buffering the source video frames in the first buffer.

8. The method of claim 7, wherein:
the client device further comprises a second buffer that is shallower than the first buffer; and
obtaining the user-interface frames comprises buffering the user-interface frames in the second buffer.

9. The method of claim 7, wherein the client device obtains the user-interface frames and the source video frames from a server system.

10. The method of claim 7, wherein the client device obtains the user-interface frames from a server system and obtains the source video frames from a content-delivery network distinct from the server system.

11. The method of claim 1, wherein:
the user-interface frames each have a second placeholder for a second video window;
the method further comprises obtaining source video frames having a second video stream in alignment with the second video window; and
the interleaving comprises interleaving the user-interface frames, the source video frames having the first video stream in the first window, and the source video frames having the second video stream in the second video window, to produce the output video stream.

12. The method of claim 11, wherein:
the electronic device is a client device that further comprises a first buffer and a second buffer;

the user-interface frames are obtained from a server system;
the source video frames having the first video stream are obtained from a first content-delivery network distinct from the server system;
the source video frames having the second video stream are obtained from a second content-delivery network distinct from the server system and the first content-delivery network;
obtaining the source video frames having the first video stream comprises buffering the source video frames having the first video stream in the first buffer; and
obtaining the source video frames having the second video stream comprises buffering the source video frames having the second video stream in the second buffer.

13. The method of claim 1, wherein:
the user-interface frames each have a second placeholder for a second video window;
the source video frames have a second video stream in alignment with the second video window; and
obtaining the source video frames comprises combining frames having the first video stream in a first slice with frames having the second video stream in a second slice, wherein the frames having the first video stream in the first slice do not have video in the second slice and the frames having the second video stream in the second slice do not have video in the first slice.

14. The method of claim 1, wherein:
the user-interface frames each have a second placeholder for a second video window;
the source video frames have a second video stream in alignment with the second video window; and
obtaining the source video frames comprises combining frames having the first video stream in a first portion with frames having the second video stream in a second portion, wherein the frames having the first video stream in the first portion do not have video in the second portion and the frames having the second video stream in the second portion do not have video in the first portion.

15. The method of claim 14, wherein the first and second portions are horizontally separated.

16. An electronic device, comprising:
one or more processors; and
memory storing one or more programs for execution by the one or more processors, the one or more programs including instructions for:
obtaining user-interface frames having a first placeholder for a first video window;
obtaining source video frames having a first video stream in alignment with the first video window;
interleaving the source video frames with the user-interface frames to form an output video stream, wherein:
the interleaving comprises:
  determining a temporal order of the user-interface frames and the source video frames in the output video stream for sequential display;
  updating frame numbers and display order fields of the source video frames and the user-interface frames in accordance with the determined temporal order; and
  forming the output video stream in accordance with the determined order, wherein, in the output video stream:
    the source video frames are output in the output video stream at a first rate, and the user-interface frames are output in the output video stream at a second rate that is distinct from the first rate; and providing the output video stream in the determined temporal order for decoding and display.

17. A non-transitory computer-readable storage medium storing one or more programs for execution by one or more processors of an electronic device, the one or more programs including instructions for:

obtaining user-interface frames having a first placeholder for a first video window;

obtaining source video frames having a first video stream in alignment with the first video window;

interleaving the source video frames with the user-interface frames to form an output video stream, wherein:

the interleaving comprises:

determining a temporal order of the user-interface frames and the source video frames in the output video stream in an alternating manner for sequential display;

updating frame numbers and display order fields of the source video frames and the user-interface frames in accordance with the determined temporal order; and forming the output video stream in accordance with the determined temporal order, wherein, in the output video stream:

the source video frames are output in the output video stream at a first rate, and the user-interface frames are output in the output video stream at a second rate that is distinct from the first rate; and providing the output video stream in the determined temporal order for decoding and display.

18. The method of claim 1, wherein the first rate of outputting the source video frames is greater than the second rate of outputting the user-interface frames.

19. The method of claim 1, wherein the second rate of outputting the user-interface frames is half of the first rate of outputting the source video frames.

20. The method of claim 7, wherein the client device performs no buffering of the user-interface frames.

* * * * *